United States Patent
McArdle

(10) Patent No.: US 7,505,947 B2
(45) Date of Patent: Mar. 17, 2009

(54) COMPUTER CONTROLLED METHOD USING GENETIC ALGORITHMS TO PROVIDE NON-DETERMINISTIC SOLUTIONS TO PROBLEMS INVOLVING PHYSICAL RESTRAINTS

(75) Inventor: James Michael McArdle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 11/255,200

(22) Filed: Oct. 20, 2005

(65) Prior Publication Data

US 2007/0112698 A1    May 17, 2007

(51) Int. Cl.
G06F 15/18 (2006.01)
G06N 5/00 (2006.01)
G06N 5/02 (2006.01)

(52) U.S. Cl. ........................................ 706/13
(58) Field of Classification Search ............. 706/13
See application file for complete search history.

(56) References Cited

U.S. PATENT DOCUMENTS

| | | | | |
|---|---|---|---|---|
| 5,148,513 A * | 9/1992 | Koza et al. | 706/13 |
| 5,319,781 A * | 6/1994 | Syswerda | 705/8 |
| 5,557,533 A * | 9/1996 | Koford et al. | 716/9 |
| 5,742,738 A * | 4/1998 | Koza et al. | 706/13 |
| 6,058,385 A * | 5/2000 | Koza et al. | 706/13 |
| 6,327,582 B1 * | 12/2001 | Worzel | 706/13 |
| 6,366,931 B1 * | 4/2002 | Borowsky et al. | 707/205 |
| 6,526,420 B2 * | 2/2003 | Borowsky et al. | 707/205 |
| 6,532,453 B1 * | 3/2003 | Koza et al. | 706/13 |
| 6,622,126 B1 * | 9/2003 | McArdle et al. | 705/26 |
| 6,625,760 B1 * | 9/2003 | Man et al. | 714/33 |
| 6,662,167 B1 * | 12/2003 | Xiao | 706/13 |
| 6,665,027 B1 * | 12/2003 | Gunn et al. | 349/95 |
| 6,754,594 B2 * | 6/2004 | Henry et al. | 702/45 |
| 6,758,102 B2 * | 7/2004 | Henry et al. | 73/861.356 |
| 6,766,497 B2 * | 7/2004 | Anderson | 716/2 |
| 6,785,662 B1 * | 8/2004 | Guy et al. | 706/13 |
| 6,917,887 B2 * | 7/2005 | Henry et al. | 702/45 |
| 6,917,926 B2 * | 7/2005 | Chen et al. | 706/12 |
| 6,937,774 B1 * | 8/2005 | Specht et al. | 382/254 |
| 6,988,076 B2 * | 1/2006 | Ouimet | 705/7 |
| 6,996,342 B2 * | 2/2006 | Park et al. | 398/48 |
| 6,996,550 B2 * | 2/2006 | Wang et al. | 706/19 |
| 7,020,617 B2 * | 3/2006 | Ouimet | 705/7 |
| 7,054,795 B1 * | 5/2006 | Aves | 703/2 |
| 7,087,901 B2 * | 8/2006 | Ambuel | 250/339.02 |
| 7,117,096 B2 * | 10/2006 | Luo et al. | 702/19 |
| 7,124,646 B2 * | 10/2006 | Henry et al. | 73/861.356 |

(Continued)

OTHER PUBLICATIONS

Micalewicz, Zbigniew et al, "GENOCOP: A Genetic Algorithm for Numerical Optimization Problems with Linear Constraints" Dec. 1996. ACM Press. pp. 1-27.*

(Continued)

*Primary Examiner*—Michael B Holmes
(74) *Attorney, Agent, or Firm*—Jerry B Kraft; Libby Z Handelsman

(57) ABSTRACT

In a computer controlled genetic algorithm method for providing non-deterministic solutions involving physical constraints the effectiveness of the genetic algorithm may be enhanced by periodically changing the combination or set of genetic operators during the genetic algorithm operation and before selecting the final solution.

14 Claims, 4 Drawing Sheets

U.S. PATENT DOCUMENTS

| | | | | |
|---|---|---|---|---|
| 7,136,761 | B2* | 11/2006 | Henry et al. | 702/45 |
| 7,162,008 | B2* | 1/2007 | Earl et al. | 378/65 |
| 7,218,924 | B2* | 5/2007 | McArdle | 455/418 |
| 7,274,332 | B1* | 9/2007 | Dupray | 342/450 |
| 7,283,993 | B2* | 10/2007 | McArdle | 707/3 |
| 7,298,327 | B2* | 11/2007 | Dupray et al. | 342/451 |
| 7,313,463 | B2* | 12/2007 | Herr et al. | 700/245 |
| 7,315,786 | B2* | 1/2008 | Dahiyat et al. | 702/19 |
| 7,366,719 | B2* | 4/2008 | Shaw | 707/6 |
| 7,379,822 | B2* | 5/2008 | Dahiyat et al. | 702/19 |
| 7,395,195 | B2* | 7/2008 | Suenbuel et al. | 703/13 |
| 7,404,336 | B2* | 7/2008 | Henry et al. | 73/861.356 |
| 2003/0018595 | A1* | 1/2003 | Chen et al. | 706/12 |
| 2003/0172043 | A1* | 9/2003 | Guyon et al. | 706/48 |
| 2004/0044633 | A1* | 3/2004 | Chen | 706/13 |
| 2004/0139041 | A1* | 7/2004 | Grichnik | 706/21 |
| 2004/0143524 | A1* | 7/2004 | Hilton | 705/35 |
| 2005/0246297 | A1* | 11/2005 | Chen et al. | 706/15 |
| 2006/0080268 | A1* | 4/2006 | Afeyan et al. | 706/13 |
| 2006/0200436 | A1* | 9/2006 | Zhou et al. | 706/13 |
| 2007/0112824 | A1* | 5/2007 | Lock et al. | 707/102 |

OTHER PUBLICATIONS

Corcoran et al. "A Genetic Algorithm for Packing in Three Dimensions". 1992 ACM. pp. 1021-1030.*

Corcoran et al. "A Genetic Algorithm for Packing in Three Dimensions". 1992 ACM. pp. 1021-1031.*

A parallel genetic algorithm for performance-driven VLSI routing Lienig, J.; Evolutionary Computation, IEEE Transactions on vol. 1, Issue 1, Apr. 1997 pp. 29-39 Digital Object Identifier 10.1109/4235.585890.*

A parallel genetic algorithm for two detailed routing problems Lienig, J.; Circuits and Systems, 1996. ISCAS '96., 'Connecting the World'., 1996 IEEE International Symposium on vol. 4, May 12-15, 1996 pp. 508-511 vol. 4 Digital Object Identifier 10.1109/ISCAS.1996.542012.*

Optimal Design of a New Nanopositioner using Genetic Algorithm Yangmin Li; Qingsong Xu; Nano/Micro Engineered and Molecular Systems, 2006. NEMS '06. 1st IEEE International Conference on Jan. 18-21, 2006 pp. 357-362 Digital Object Identifier 10.1109/NEMS.2006.334758.*

Genetic algorithm based optimization design of miniature piezoelectric forceps Susanto, K.; Bingen Yang; Robotics and Automation, 2004. Proceedings. ICRA '04. 2004 IEEE International Conference on vol. 2, Apr. 26-May 1, 2004 pp. 1358-1363 vol. 2 Digital Object Identifier 10.1109/ROBOT.2004.1308013.*

Genetic design of analog IIR filters with variable time delays for optically controlled microwave signal processors Neubauer, A.; Evolutionary Computation, 1997., IEEE International Conference on Apr. 13-16, 1997 pp. 437-442 Digital Object Identifier 10.1109/ICEC.1997.592351.*

Analysis and design optimization of front-end passive components for voltage source inverters Chen, G.; Rentzch, M.; Wang, F.; Boroyevich, D.; Ragon, S.; Stefanovic, V.; Arpilliere, M.; Applied Power Electronics Conference and Exposition, 2003. APEC '03. Eighteenth Annual IEEE vol. 2, Feb. 9-13, 2003 pp. 1170-1176 vol. 2.*

Optimal procurement of VAR ancillary service in the electricity market considering voltage security El-Araby, E.E.; Yorino, N.; Zoka, Y.; Circuits and Systems, 2005. ISCAS 2005. IEEE International Symposium on May 23-26, 2005 pp. 5290-5293 vol. 5 Digital Object Identifier 10.1109/ISCAS.2005.1465829.*

Action module planning and its application to an experimental climbing robot Bevly, D.M.; Farritor, S.; Dubowsky, S.; Robotics and Automation, 2000. Proceedings. ICRA '00. IEEE International Conference on vol. 4, Apr. 24-28, 2000 pp. 4009-4014 vol. 4 Digital Object Identifier 10.1109/ROBOT.2000.845356.*

Genetic-based minimum-time trajectory planning of articulated manipulators with torque constraints Chan, K.K.; Zalzala, A.M.S.; Genetic Algorithms for Control Systems Engineering, IEE Colloquium on May 28, 1993 pp. 4/1-4/3.*

Evolutionary optimization of cubic polynomial joint trajectories for industrial robots Kai-Ming Tse; Chi-Hsu Wang; Systems, Man, and Cybernetics, 1998. 1998 IEEE International Conference on vol. 4, Oct. 11-14, 1998 pp. 3272-3276 vol. 4 Digital Object Identifier 10.1109/ICSMC.1998.726508.*

An evolutionary algorithm for network topology design Youssef, H.; Sait, S.M.; Khan, S.A.; Neural Networks, 2001. Proceedings. IJCNN '01. International Joint Conference on vol. 1, Jul. 15-19, 2001 pp. 744-749 vol. 1 Digital Object Identifier 10.1109/IJCNN.2001.939117.*

Optimal design of linear oscillatory actuator using genetic algorithm Enomoto, H.; Harada, K.; Ishihara, Y.; Todaka, T.; Hirata, K.; Magnetics, IEEE Transactions on vol. 34, Issue 5, Part 1, Sep. 1998 pp. 3515-3518 Digital Object Identifier 10.1109/20.717829.*

* cited by examiner

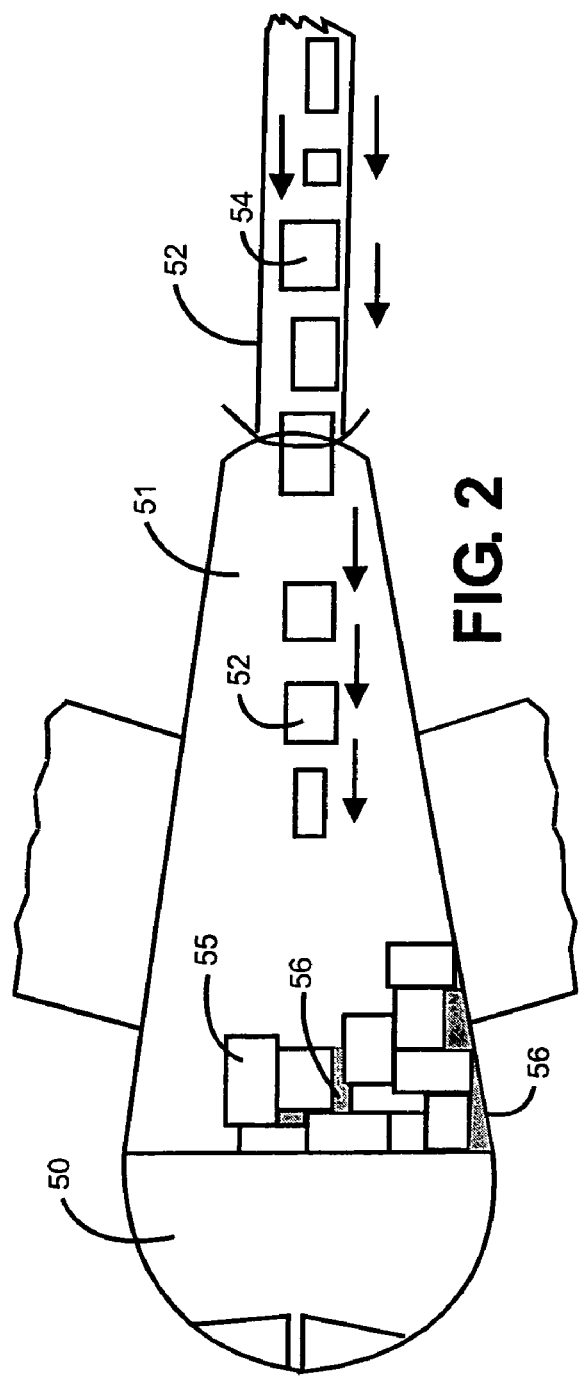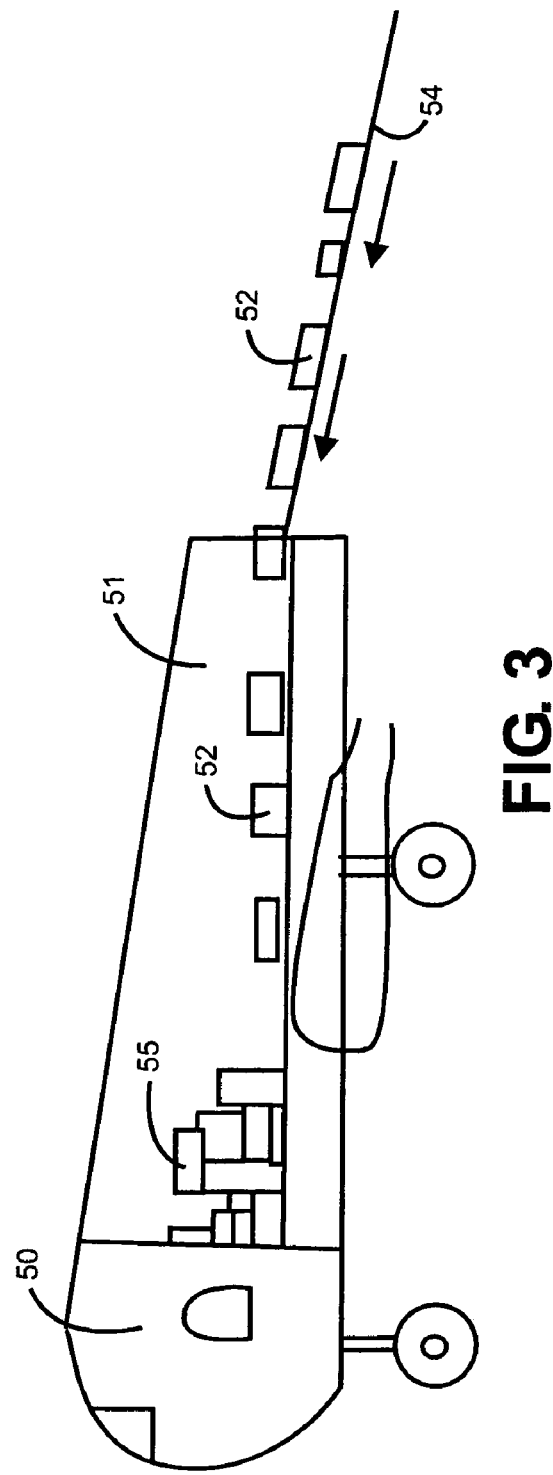

COMPUTER CONTROLLED METHOD USING GENETIC ALGORITHMS TO PROVIDE NON-DETERMINISTIC SOLUTIONS TO PROBLEMS INVOLVING PHYSICAL RESTRAINTS

TECHNICAL FIELD

The present invention relates to genetic algorithms, applied in the physical world to provide solutions to non-deterministic problems involving a variety of physical constraints, e.g. limitations on physical attributes such time, distance, space, linear dimensions, thermodynamic and chemical properties.

BACKGROUND OF INVENTION

Although modern genetics as a science is almost two hundred years old, it has only been over the past forty years, along with the emergence and development of computer technology that evolutionary computation has developed. This technology involves the observation of information processing principles in nature that are then transformed into computational algorithms usable in computers for problem solving.

One significant area in the development of such algorithms has been genetic algorithms derived from the evolutionary sciences. Extensive genetic algorithms have been developed for use on the computer in the determination of genetic heritage and evolution, e.g. survival of the fittest: the genetic rise of well adapted organisms surviving in a potentially adverse environment.

With the extensive body of algorithms developed and attendant mathematics for the genetic and hereditary sciences, it followed that the art would try to take advantage of these developed computer algorithms in mathematically analogous technologies. As a result, the genetic algorithm technology has emerged. In this heuristic approach, data elements are treated as equivalent to genes in nature. Individual solutions are represented by alphanumeric character strings (chromosomes), most simply by strings of bits in genetic algorithms. All of the individuals or individual solutions in each generation are allowed to mathematically reproduce in an operation involving a predetermined combination of crossovers, mutations, as well as minor variations involving only minor incremental changes in the individual bits (genes) in the resulting individual solution. All of the individuals of the resulting generation are then evaluated by a fitness function. Then, dependent on whatever parameters may be selected for the replacement of the generations, a subset of parents and offspring form the population for the next reproduction or regeneration. In a basic genetic algorithm, the complete offspring may be used for the next generation, i.e. total generation replacement. In the present applications, the offspring and the parents, or the offspring alone are ranked by a fitness formula or function to provide fitness values, and only a selected percentage of the offspring are moved into the next generation. Of course, how effective the method is depends on how effectively the objective of the genetic algorithm is encoded in the fitness function. In any event, after a number of generations or iterations, the population will hopefully consist of the best adapted individual solutions in terms of the fitness function. In the application of genetic algorithms as described above, it is customary to equate and represent each possible solution as a different chromosome (bit string) and each physical limitation or constraint to the solution as a gene (bit) in the string.

In this environment it is, of course, the objective to move as high a number of the best solutions (chromosomes) into each successive generation. However, dependent on whatever parameters may be selected for the replacement of the generations, sooner or later, it can happen that good individuals (solutions) may die out because they pair with inferior individuals (solutions). In order to offset this result, it has been considered to discard those solutions (chromosomes) the fitness function of which did not change after a number, i.e. 50, of iterations or generations during which such solutions existed, i.e. were not discarded.

SUMMARY OF INVENTION

The present invention provides for a modification wherein the effectiveness of the genetic algorithm may be enhanced by periodically changing the combination or set of genetic operators during the genetic algorithm operation and before selecting the final solution.

Accordingly, in a computer controlled genetic algorithm method for providing non-deterministic solutions involving physical constraints comprising the steps of: generating an existing population of N solutions (chromosomes) to a problem, each solution (chromosome) including a set of values for a predetermined number, M, of said physical constraints (genes); regenerating a next generation from said initial population by reproducing a percentage, P, of the N, i.e. (P=% N) solutions through the application of a set of genetic operators to said N solutions (chromosomes); a percentage often selected is N/2 or 50%. Then a weighted fitness function to said P solutions to fail and thereby discard a predetermined number of said P solutions. The undiscarded solutions may be added to a number of existing solutions to provide the next generation of solutions, and after a plurality of said regenerations, the solution having the highest fitness function value is selected. The present invention provides an improvement that comprises keeping a count of the number of these regenerations that each existing solution, e.g. a solution that is undiscarded, and changing said set of genetic operators applied to each existing solution after at least one predetermined number of regenerations have been counted for any solution. It should be noted that the set of genetic operators that determines the number and or the percentage of the offspring P solutions that will pass or fail includes the following parameters: A) the ratios of crossovers, mutations and minor variations set to show up in the next generation; and B) the value levels of the fitness function that determines the numbers of next generation or offspring solutions are discarded, and how many are retained in the next generation.

For best results, a sufficient number of existing solutions are added to the undiscarded solutions to provide a next generation population of N solutions. According to another aspect of the invention, the undiscarded solutions are added to a plurality of other undiscarded solutions to provide a next generation population of solutions.

Also, the set of genetic operators applied to each solution may be changed a plurality of times, each after respective predetermined numbers of a said plurality of said counts. The set of genetic operators conventionally includes a % of N mutations and a % of N crossovers. The set of genetic operators also includes the value level of the fitness function determining the number of said P solutions. Also, the second or changed set of genetic operators includes a changed value of said fitness function determining the number of said P solutions.

The deterministic solution of this invention may involve linear constraints including spatial relations, time and distance constraints and thermodynamic constraints.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 2 is a diagrammatic plan view illustrative of an exemplary loading of a cargo plane with shipping cartons of a variety of sizes to illustrate how the genetic algorithms of the present invention may be used to arrive at the best solution for the order and arrangement for the stacking of the cartons in the cargo plane;

FIG. 3 is a diagrammatic side view of the plane and carton arrangement shown in FIG. 2;

DETAILED DESCRIPTION OF THE PREFERRED EMBODIMENT

There is a considerable amount of published background art of the application of genetic algorithms to analogous real world problems that do not have deterministic solutions, and that are subject to physical constraints including constraints of time and distance, thermodynamics and a variety of linear constraints, particularly spatial relations. A basic compilation of genetic algorithm technology may be found in the paper, *Genetic Algorithms*, published in 1998, by Marek Obitko, Czech Technical University or on the Web. Web.

Another publication dealing with linear constraints in genetic algorithms is: *An Evolutionary Algorithm for Solving the Geometrically Constrained Site Layout Problem*, H. Harmanani et al., Lebanese American University, PO Box 36, Byblos Lebanon, and available from the University or the Web.

This last publication also recognizes that the "chromosomes" representing the respective possible solutions do age, and recommends that solutions (chromosomes), the fitness function value of which did not change after 50 iterations (generations), should be discarded.

From the variety of physical solutions to which genetic algorithms may be applied, an illustrative example has been chosen as shown in FIG. 2 involving a collection of different sized rectangular cartons or boxes that are to be loaded and packed into a limited space, e.g. the cargo hold of a cargo airplane so as to be moved.

Figure 1:
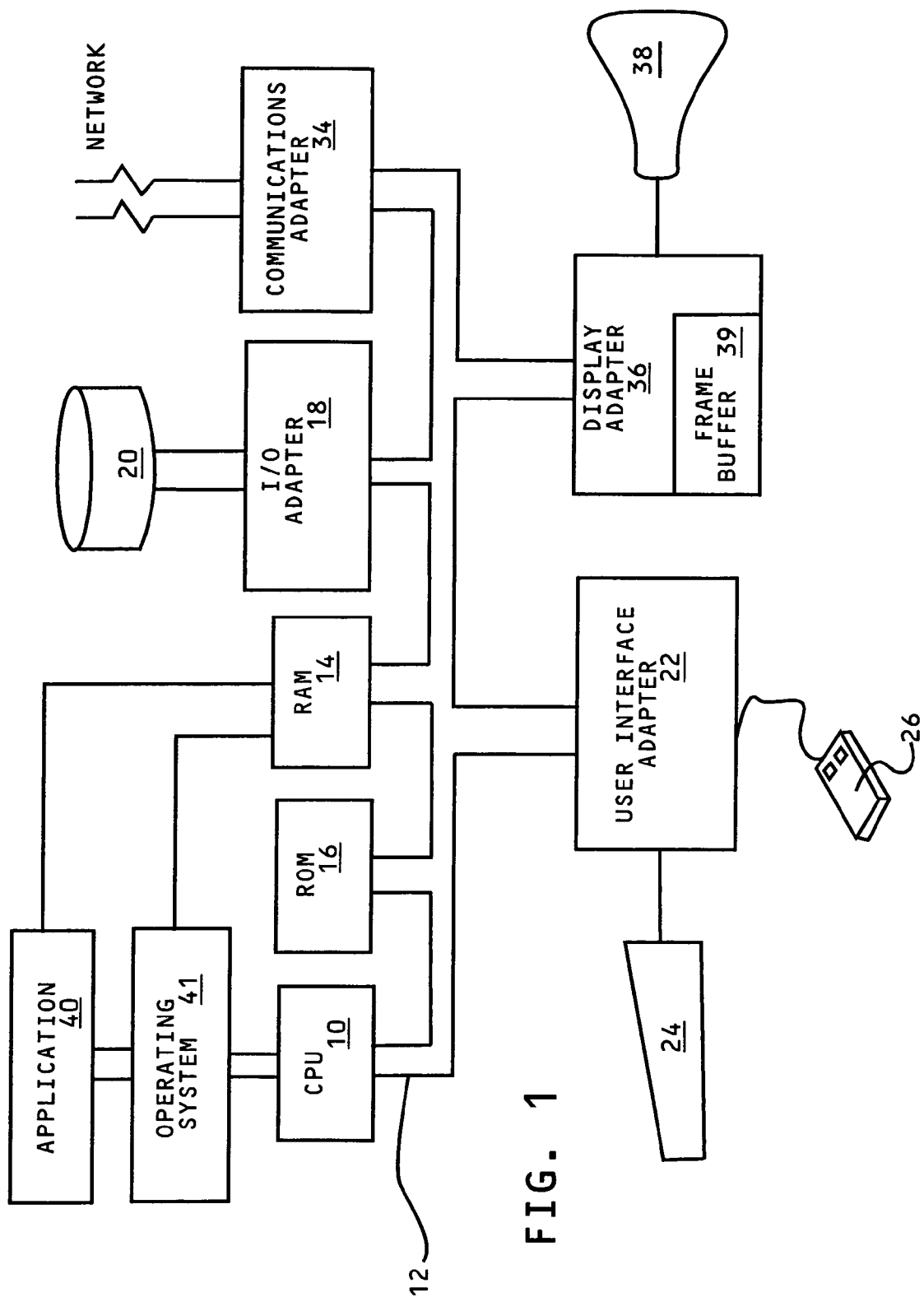
FIG. 1 is a block diagram of a generalized data processing system including a central processing unit that provides the normal computer controlled interactive display system that may be used in practicing the present invention.

However, before describing the illustrative example of FIG. 2, reference is made to FIG. 1, a typical data processing system is shown that may function as the computer controlling the genetic algorithm method of the present invention. The data processing central processing unit (CPU) 10, such as one of the PC microprocessors or workstations, e.g. RISC System/6000™ (RS/6000) series available from International Business Machines Corporation (IBM), is provided and interconnected to various other components by system bus 12. An operating system 41 runs on CPU 10, provides control and is used to coordinate the function of the various components of FIG. 2. Operating system 41 may be one of the commercially available operating systems such as the AIX 6000™ operating system available from IBM; Microsoft's Windows XP™, as well as UNIX and IBM AIX operating systems. Application programs 40, controlled by the system, are moved into and out of the main memory, random access memory (RAM) 14. These programs include the programs of the present invention for providing the genetic algorithm method for non-deterministic solutions involving physical constraints. A read only memory (ROM) 16 is connected to CPU 10 via bus 12 and includes the basic input/output system (BIOS) that controls the basic computer functions. RAM 14, I/O adapter 18 and communications adapter 34 are also interconnected to system bus 12. I/O adapter 18 communicates with the disk storage device 20. Communications adapter 34 interconnects bus 12 with the outside network enabling the data processing system to communicate as respectively described above through the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. Display adapter 36 includes a frame buffer 39 that is a storage device that holds a representation of each pixel on the display screen 38. Images may be stored in frame buffer 39 for display on monitor 38. By using the aforementioned I/O devices, a user is capable of inputting information to the system through the keyboard 24 or mouse 26 and receiving output information from the system via display 38.

Returning now to FIGS. 2 and 3, consider a collection of different sized rectangular boxes 52 that are being packed into a cargo plane 50, such as those planes used by the various overnight carriers. The boxes 52 are moved up ramp 54 in the cargo hold 51 of the plane 50 and stacked in stacks 55. The goal is to pack as many of the boxes 52 as possible without, in any way, deforming any box while minimizing the amount of gaps or wasted space 56. Thus, for any solution to be valid, a check is made to determine that all boxes fit inside the bounds of cargo hold 51 and that no two boxes occupy the same space. In addition, a solution score could be determined as to how much volume the solution takes up including the gaps 56. The valid solution with the smallest volume would be the best solution. Other possible scores could be based on the area taken up by the boxes in the plane or top view of FIG. 2 wherein boxes are stacked as high as possible in the innermost section of the cargo hold (to be scored the highest). However, when, as the stacking is worked toward the rear of the hold and the ramp doors and lower stacking is desirable, the scoring could be modifiable to reflect this situation.

Figure 4:
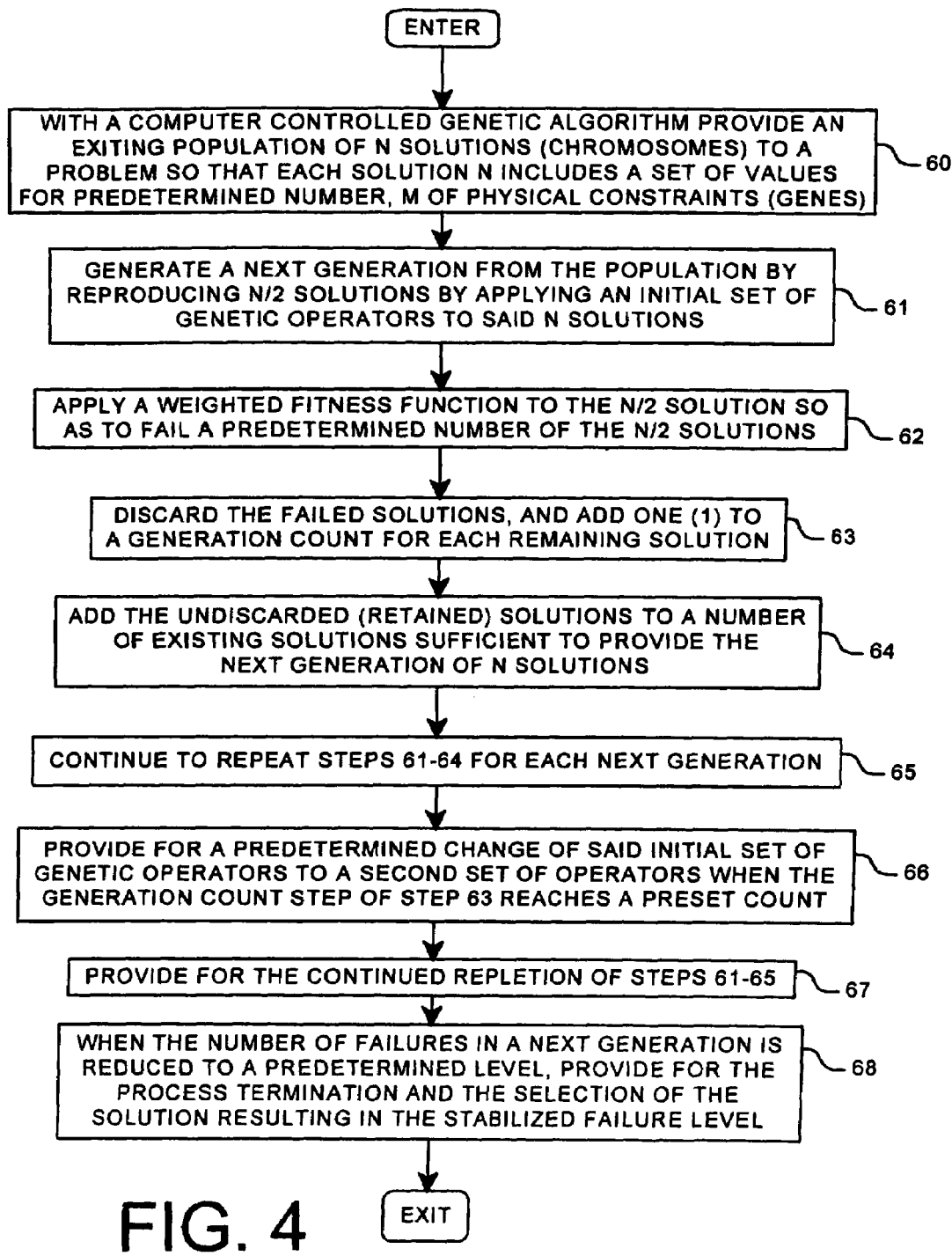
FIG. 4 is a flowchart of the steps involved in applying the method of the present invention to provide a non-deterministic solution used in genetic algorithms.
Figure 5:
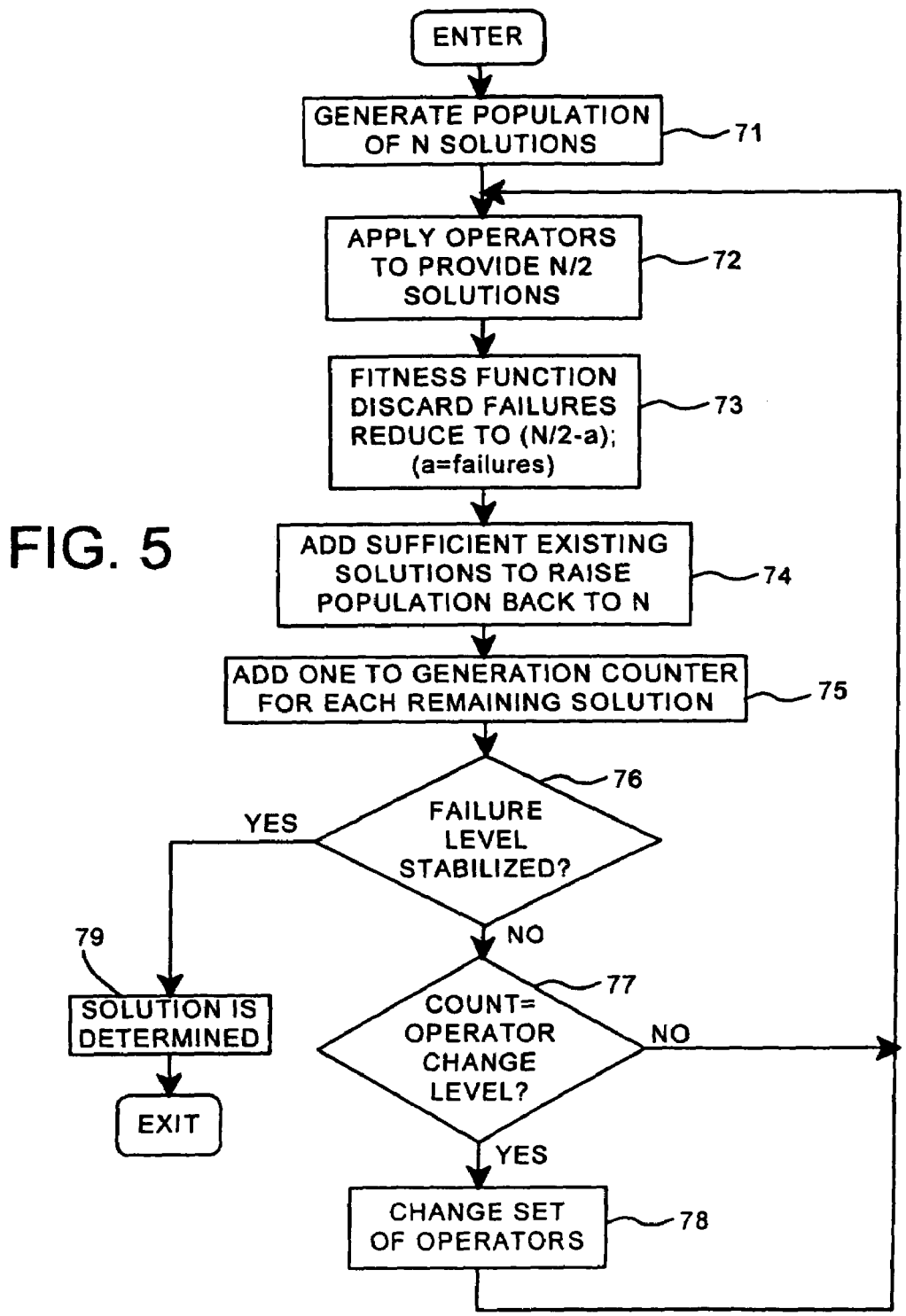
FIG. 5 is a flowchart of an illustrative running of the steps set up in the program of FIG. 4.

Now, continuing to use the physical embodiment of FIGS. 2 and 3, the advance of the present invention will be illustrated with respect to FIGS. 4 and 5. Commencing in the FIG. 4 process, start with a collection of solutions, step 60, whether valid or not, the existing population of N solutions (chromosomes) to the plane loading problem of FIGS. 2 through 3. Each solution will include a set of values for a predetermined number, M of physical constraints (genes). Then, step 61, the next generation is generated by reproducing a percentage P of the N solutions. For convenience in illustration, we will use 50% of the solutions, i.e. N/2 solutions, by applying an initial set of genetic operators to the initial population of N solutions. This may done by any of the conventional operators described in the above-cited publications. Using the illustration of FIGS. 2 through 3, mutation operators could mutate some of the N existing solutions by changing the coordinates of one or more of the boxes by altering a box's X, Y and Z location by interchanging X with Y or Z, or by adding a small increment to X, or Y or Z, or all coordinates, or even by changing the relative location of a box. Crossover operators could generate the next generation though splicing or mixing two of the existing N solutions, e.g. by splitting an existing solution at two or more points, and swapping with a similar solution. Also, a Variation Operator could add a box to an existing solution to create a new solution.

Next, step 62, a weighted fitness function is applied to the resulting N/2 so as to fail a predetermined number or percentage of the N/2 solutions of this next generation. The weight or score that determines the pass/fail could score such factors as whether each box in the solution fits within the airplane cargo hold dimensions. For such an attribute, each solution would be weighted or scored by how far off the solution was from the ideal value for the attribute. For example: 100 points should be given if all boxes fit inside of the cargo hold, with 100-n points for all solutions outside of the ideal dimensions (one point would be subtracted for each box outside of the cargo hold).

At this point, step 63, the fitness function score could be applied to discard the failed solutions. Also, the generation count for each remaining solution is incremented by one. For purposes of the present example, let us assume that the failed solutions are a fraction of the N/2 solutions resulting in this next generation. There are many approaches for maintaining the existing population of solutions after the creation of a next generation. In the example of this invention, a number of existing solutions is added to the passed and retained solutions sufficient to provide an existing population of N solutions in this next generation, step 64.

Then, step 65, steps 61 through 64, are repeated for each next generation while a count of the generations is maintained. In carrying out this process, provision is made, step 66, for changing the initial set of genetic operators being applied at one or more predetermined generation counts. In the present example, the initial set of genetic operators is changed twice: when the generation count is less than 20, all N/2 solutions in the offspring or next generation are kept and not discarded; between a count 20 and 50 generations, all solutions with a fitness function value of less than 95 points are discarded; and with a generation count greater than 50, all solutions with a fitness function value of less than 100 points are discarded.

In any event, step 67, there is a continued repetition of steps 61 through 65. The number of failures in each new generation is monitored, step 68, and when the number of failures is reduced to below a predetermined failure level, the process is considered to be stabilized and the solution resulting in the stable environment is the best solution. In our example, the iterating of generations is stopped when let us say 10% of the next generation has reached 100 points or better. At this point, the best solution, i.e. the solution wherein the cargo hold holds the greatest number of boxes, is chosen.

Now, with reference to the flowchart of FIG. 5 a simplified illustrative run of the process set up in FIG. 4 will be described. Using the method described in FIG. 4, a population of N solutions is generated, step 71. Next, using mutation and crossover operators, the next generation of N/2 solutions is developed, step 72. Next, using a initial fitness function value, step 73, to discard failures, the next generation is developed. The number of failures is deducted from the N/2 solutions to reduce the population to (N/2−a). Since we are working this example with a constant population, a sufficient number (a) of existing solutions is added to this next generation population to increase the population back to N, step 74. As previously mentioned, each solution has its own age counter. Thus, since we are at this point at the next generation, one (1) is added to the age counter for each remaining solution, step 75. It should be noted that each solution has its own generation or age counter. Accordingly, if the number N of remaining or existing solutions is seventy-five, there would be seventy-five solutions. If a new "child" solution is created in a next generation, it starts with a new generation count. Next, a determination is made, step 76, as to whether the failure level has stabilized. This is carried out as described in step 68, FIG. 4. If Yes, then, step 79, the algorithm is considered to be stabilized, and the optimum solution is selected as described in step 68, FIG. 4, after which the method is exited. If the determination in step 76 is No, then a further determination is made, step 77, as to whether the generation or age count for any solution has reached a preset level as described in FIG. 4, step 66, wherein a change is to be made to another set of genetic operators. If Yes, then, step 78, the operators are changed for the particular solution. Then, or if the determination in step 77 is No, the process is branched back to step 72, and the next generation is processed.

While the illustration describes a single change in operators applied in the age or generation count of a particular level, it will be understood that there may be several levels in the life of a particular solution with the final level being "discard" level wherein a solution is discarded when it has reached "old age" without significant advance.

Although certain preferred embodiments have been shown and described, it will be understood that many changes and modifications may be made therein without departing from the scope and intent of the appended claims.

What is claimed is:

1. In a computer controlled genetic algorithm method for providing solutions involving physical constraints comprising:

generating an existing population of N, where N represents the number of solutions (chromosomes) to a problem, each solution (chromosome) including a set of values for M, where M represents a predetermined number of said physical constraints (genes);

regenerating a next generation from said initial population by reproducing P solutions where P represents a percentage of N solutions obtained through the application of a set of genetic operators to said N solutions (chromosomes);

applying a weighted fitness function to said P solutions to fail and thereby discard a number of said P solutions;

adding the undiscarded solutions to a number of existing solutions to provide the next generation of solutions; and after a plurality of said regenerating steps, selecting the solution having the highest fitness function value;

the improvement comprising:

applying said genetic algorithm method for providing solutions to determine the optimum arrangement of tangible objects each having defined linear dimensions within a container of defined linear dimensions;

counting the number of a plurality of said regenerations for each solution; and changing said set of genetic operators for each solution after a predetermined plural number of said regenerations.

2. The method of claim 1 wherein said set of genetic operators is changed a plurality of times for each solution after respective predetermined numbers of said plurality of said counts.

3. The method of claim 2 wherein said set of genetic operators includes a percentage of N mutations, and a percentage of N crossovers.

4. The method of claim 1 wherein said set of genetic operators includes the value level of the fitness function determining the number of said P solutions.

5. The method of claim 4 wherein said changed set of genetic operators includes a changed value of said fitness function determining the number of said P solutions.

6. The method of claim 4 wherein said step of selecting the solution having the highest fitness function value is carried out after a predetermined count of said regenerations.

7. The method of claim 1 wherein said undiscarded solutions are added to a plurality of other undiscarded solutions to provide a next generation population of solutions.

8. A computer program comprising a computer useable medium having a computer readable program including a genetic algorithm for providing solutions involving physical constraints, wherein the computer readable program when executed on a computer causes the computer to:
   generate an existing population of N, where N represents the number of solutions (chromosomes) to a problem, each solution (chromosome) including a set of values for M, where M represents a predetermined number of said physical constraints (genes);
   regenerate a next generation from said initial population by reproducing P solutions where P represents a percentage of N solutions obtained through the application of a set of genetic operators to said N solutions (chromosomes);
   apply a weighted fitness function to said P solutions to fail and thereby discard a number of said P solutions;
   add the undiscarded solutions to a number of existing solutions to provide the next generation of solutions; and
   after a plurality of said regenerate steps, select the solution having the highest fitness function value;
   the improvement comprising causing the computer to:
   apply said genetic algorithm method for providing solutions to determine the optimum arrangement of tangible objects each having defined linear dimensions within a container of defined linear dimensions;
   count the number of a plurality of said regenerations for each solution; and
   change said set of genetic operators for each solution after a predetermined plural number of said regenerations.

9. The computer program of claim 8 wherein said set of genetic operators is changed a plurality of times for each solution after respective predetermined numbers of said plurality of said counts.

10. The computer program of claim 9 wherein said set of genetic operators includes a percentage of N mutations, and a percentage of N crossovers.

11. The computer program claim 8 wherein said set of genetic operators includes the value level of the fitness function determining the number of said P solutions.

12. The computer program of claim 11 wherein said changed set of genetic operators includes a changed value of said fitness function determining the number of said P solutions.

13. The computer program of claim 11 wherein said step of selecting the solution having the highest fitness function value is carried out after a predetermined count of said regenerations.

14. The computer program of claim 8 wherein said undiscarded solutions are added to a plurality of other undiscarded solutions to provide a next generation population of solutions.

* * * * *